W. W. ROBBINS.
ADJUSTABLE MILK STOOL.
APPLICATION FILED MAY 16, 1911.
1,009,578.
Patented Nov. 21, 1911.
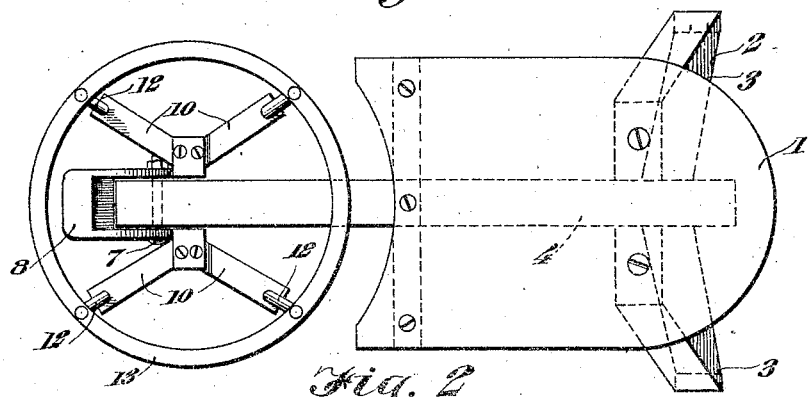
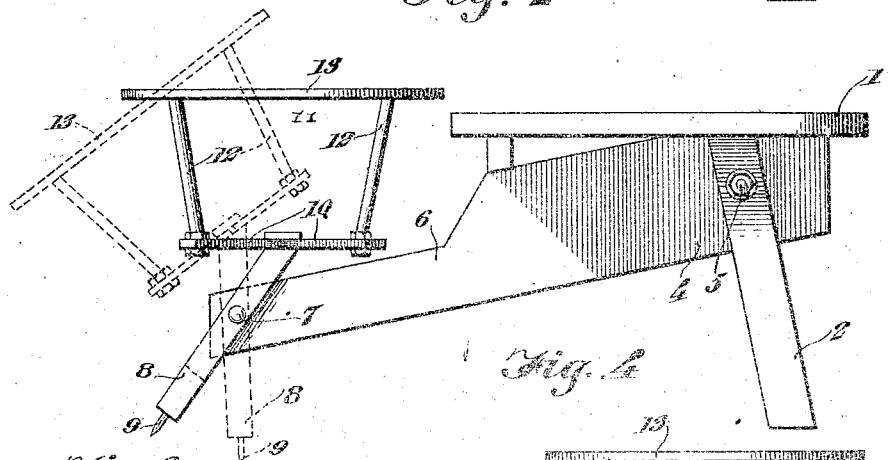
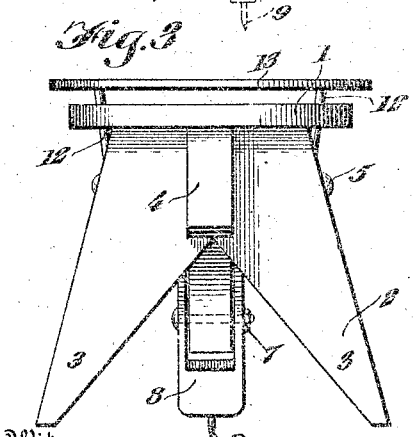
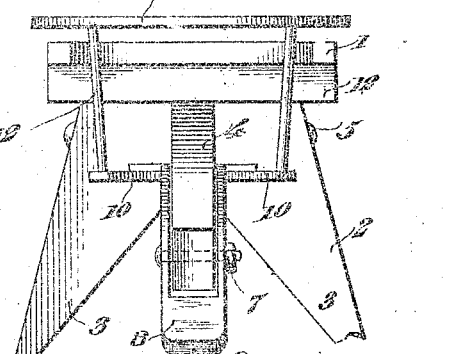
Witnesses
A. W. Gardes
Inventor
Warren W. Robbins
By Victor J. Evans
Attorney

UNITED STATES PATENT OFFICE.

WARREN W. ROBBINS, OF REYNOLDS, ILLINOIS.

ADJUSTABLE MILK-STOOL.

1,009,578.

Specification of Letters Patent. Patented Nov. 21, 1911.

Application filed May 16, 1911. Serial No. 627,509.

*To all whom it may concern:*

Be it known that I, WARREN W. ROBBINS, a citizen of the United States, residing at Reynolds, in the State of Illinois, have invented new and useful Improvements in Adjustable Milk-Stools, of which the following is a specification.

This invention relates to milk stools and consists in certain novel features of construction, arrangement of parts and combination of elements hereinafter fully set forth and claimed.

In the drawings, accompanying this specification, there has been illustrated a simple and preferred embodiment of the improvement, it being understood, however, that changes in the minor details, such as to size, proportion, material, etc., which fall within the scope of the appended claims, may be made, if desired.

In the drawings,—Figure 1 is a top plan view of the improved stool. Fig. 2 is a side elevation of the same, illustrating by the dotted lines the manner of adjusting the pail holder. Fig. 3 is a rear elevation of the device. Fig. 4 is a front elevation of the same.

The improved milk stool comprises essentially a seat 1 which has its rear portion formed with a suitable support 2. The support 2 preferably comprises a single member having its lower portion cut away in the form of a V so as to provide oppositely arranged legs 3. The side walls of the member 2 are preferably inclined from the seat 1 outwardly and toward the bottom of the legs 3. The member 2 is centrally bifurcated to provide for the reception of a longitudinally extending member 4. This member 4 is preferably formed of a piece of timber and is connected to the support 2 through the medium of a rod 5 or in any other suitable or desired manner. The member 4 is also connected with the side 1 through the medium of suitable elements such as screws or the like, and the top portion of the member 2 is likewise connected with the said member. The member 3 has its forward portion reduced as at 6 and pivotally connected with the said reduced portion as at 7, is a bifurcated element 8, the lower portion of which being provided with a spur 9. This bifurcated member forms the front leg for the stool, and the sides of the said leg have their upper portions bent at an angle to the said sides to provide means whereby the base 10 of the pail holder 11 is connected with the said leg 8. The base 10 of the pail holder preferably comprises angular members, four in number, and arranged diametrically opposite each other. The extremity of the base is formed or otherwise provided with upwardly and outwardly extending arms 12, and secured to the said arms in any desired manner is a ring 13 which forms the top of the pail holder.

By reference to the figures of the drawing, it will be noted that the leg 8 may be swung to any desired position upon the extension 6 of the member 4 so that the pail within the holder may be adjusted to the convenience of the occupant of the seat. While the leg 8 has been described as being formed with the spur 9, it is to be understood that the said leg below its bifurcated arms may be cone shaped and the spur dispensed with if desired.

Having thus fully described the said invention, what I claim is:—

1. A milking stool comprising a seat and a longitudinally extending beam arranged centrally of and connected with the seat and projecting beyond the inner end of said seat, oppositely arranged leg members secured to the beam and to the rear portion of the said seat, the extended portion of the beam having a single leg member pivotally connected thereto, the said leg member having its lower face provided with a spur, the upper face of the said leg member having a pail holder, and said holder being arranged at an angle in relation to the said leg.

2. A milking stool embodying a seat, supports for the seat and a forwardly projecting member, a bifurcated member pivotally connected with the extending member, a spur upon the lower face of the bifurcated member, the upper portions of the arms formed by the bifurcated member having offsets arranged at an angle to the said arms, a pail holder, said holder having its base formed of angularly arranged members secured to the offset portions of the bifurcated member, arms secured to the base and
5 projecting upwardly at an angle therefrom, and a ring connected with the said arms, substantially as described.

In testimony whereof I affix my signature in presence of two witnesses.

WARREN W. ROBBINS.

Witnesses:
　CARL WAYNE,
　A. Y. BRADFORD.